United States Patent [19]

Bencuya et al.

[11] Patent Number: 4,843,473
[45] Date of Patent: Jun. 27, 1989

[54] CHARGE INJECTION DEVICE WITH LOW NOISE READOUT

[75] Inventors: Selim S. Bencuya, Newton, Mass.; Gerald J. Michon, Waterford; Jerome J. Tiemann, Schenectady, both of N.Y.; James R. Toker, Cambridge, Mass.; Thomas L. Vogelsong, Schenectady, N.Y.

[73] Assignee: Polaroid Corporation, Cambridge, Mass.

[21] Appl. No.: 170,938

[22] Filed: Mar. 21, 1988

[51] Int. Cl.$^4$ .............................................. H04N 3/15
[52] U.S. Cl. ........................... 358/213.18; 358/213.15
[58] Field of Search .................... 358/213.15, 213.18, 358/213.26, 213.17, 221, 44

[56] References Cited

U.S. PATENT DOCUMENTS

| 4,064,533 | 12/1977 | Lampe et al. | 358/213.26 |
|---|---|---|---|
| 4,336,557 | 6/1982 | Koch | 358/213 |
| 4,363,963 | 12/1982 | Ando | 250/211 J |
| 4,380,755 | 4/1983 | Endlicher et al. | 358/213.15 |
| 4,389,674 | 6/1983 | Hitt et al. | 358/213 |
| 4,392,157 | 7/1983 | Garcia et al. | 358/213 |
| 4,407,010 | 9/1983 | Baji et al. | 358/213 |
| 4,430,672 | 2/1984 | Berger | 358/213 |
| 4,463,388 | 7/1984 | Soneda et al. | 358/212 |
| 4,466,018 | 8/1984 | Soneda et al. | 358/213 |
| 4,511,804 | 4/1985 | Ozawa | 250/578 |
| 4,532,549 | 7/1985 | Ozaki et al. | 358/213 |
| 4,547,807 | 10/1985 | Mitani et al. | 358/213 |
| 4,556,851 | 12/1985 | Levine | 329/50 |
| 4,556,910 | 12/1985 | Tisue | 358/212 |
| 4,577,230 | 3/1986 | Ozawa et al. | 358/212 |
| 4,577,231 | 3/1986 | Ohba et al. | 358/212 |
| 4,581,651 | 4/1986 | Miyata et al. | 358/213 |
| 4,584,609 | 4/1986 | Klein et al. | 358/213.15 |
| 4,608,606 | 8/1986 | Levine | 358/213 |
| 4,644,287 | 2/1987 | Levine | 329/50 |
| 4,680,476 | 7/1987 | Berger et al. | 250/578 |
| 4,689,808 | 8/1987 | Moorman et al. | 377/60 |

OTHER PUBLICATIONS

Patent Disclosure Letter on "Improved On-Chip Amplifier CID Image Sensor Architecture", by G. Michon, dated Sept. 23, 1986.

Primary Examiner—Jin F. Ng
Assistant Examiner—Stephen Brinich
Attorney, Agent, or Firm—Edward S. Roman

[57] ABSTRACT

A charge injection imaging device comprises low bandwidth, low noise performance column amplifiers serially connected to respective charge coupled device storage lines. Image and/or noise defining electronic information signals are retrieved from the charge injection imaging device by way of the amplifiers and storage lines in a manner which provides image defining electronic information signals from which the noise defining electronic information signal portions have been automatically subtracted for each succeeding photosensitive element of the device. The subtracted noise portions include both KTC noise and fixed pattern noise which are normally inherently associated with the image defining electronic information signals retrieved from the charge injection imaging device.

9 Claims, 3 Drawing Sheets

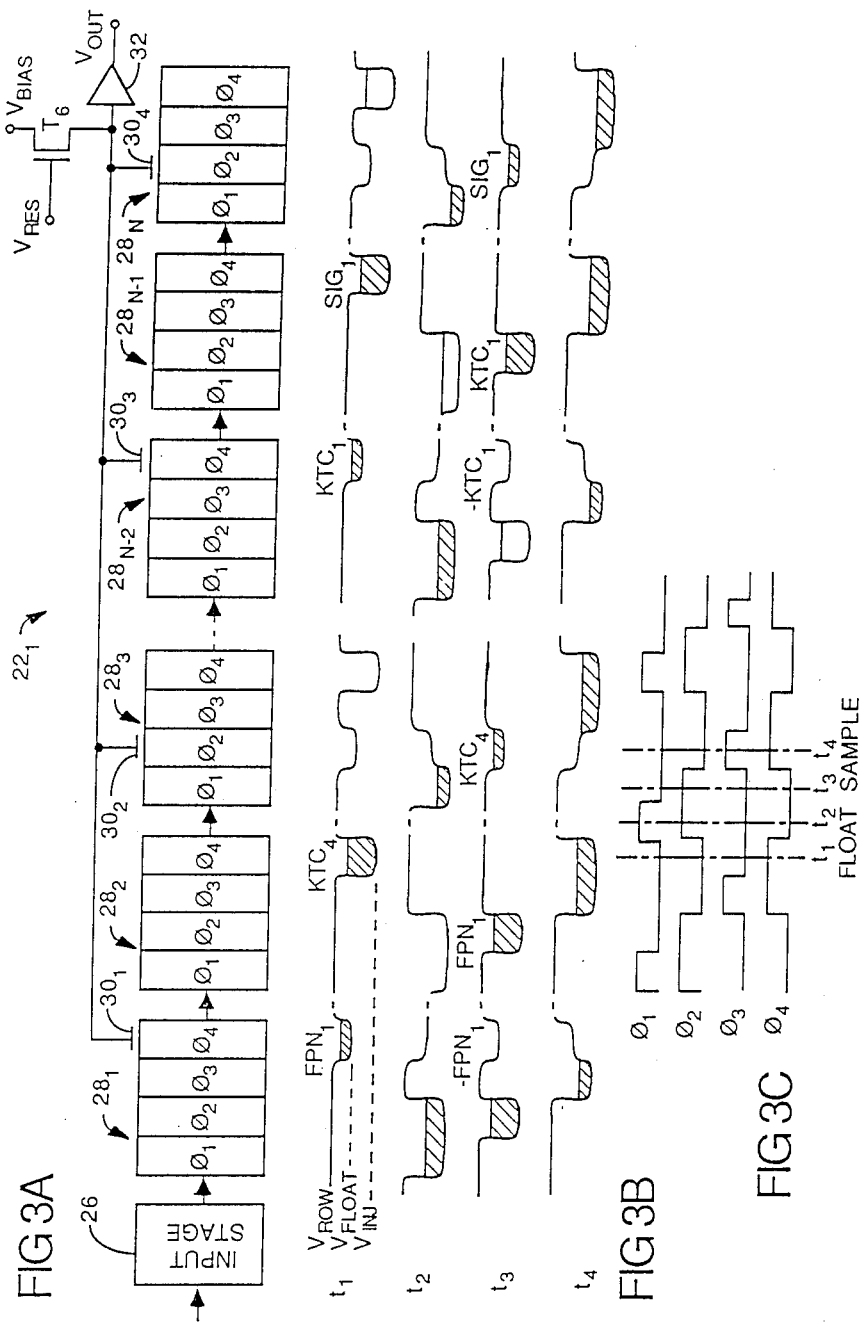

CHARGE INJECTION DEVICE WITH LOW NOISE READOUT

BACKGROUND OF THE INVENTION

1. Field of the Invention

This invention relates generally to a charge injection imaging device with low noise readout and, more particularly, to a charge injection imaging device which can provide image defining signals for each succeeding photosensitive element thereof from which noise defining signals are automatically offset.

2. Description of the Prior Art

Charge injection imaging devices comprising a plurality of photosensitive elements arranged in a matrix of rows and columns are well known in the art. Each of the photosensitive elements comprises a row and column electrode. All the row electrodes in each row are in common connection with respect to each other, and all the column electrodes in each column are in common connection with respect to each other also. Incident scene light operates to photogenerate minority charge carriers in potential wells under each pair of electrodes in each photosensitive element. The photogenerated charges may be transferred between wells within each of the photosensitive elements by applying appropriate bias voltages to respective ones of the column and row electrodes. In one well-known mode of operation, the charges may be sensed from the electrodes out of the CID along common lines interconnecting each column of electrodes.

Most recently, it has been suggested that amplifiers may be integrated with the column electrodes. Such amplifiers preferably should be of low bandwidth in order to facilitate low noise performance when reading out the charge injection imaging device. Each amplifier must also be of substantially narrow width or pitch in order to accommodate its alignment with a respective one of the columns without substantially increasing the width of the silicon area of the charge injection imaging device.

Not only must the amplifiers be of the aforementioned narrow pitch while still exhibiting low noise and bandwidth performance characteristics, but noise inherent to the charges sensed from the photosensitive elements such as KTC noise and fixed pattern noise must also be offset from the output signal. KTC noise is inherently induced in each of the common column electrode interconnect lines upon resetting the electrode voltages while fixed pattern noise occurs due to variations in the crossing of the common column electrode interconnect lines with the common row electrode interconnect lines as a result of inherent limitations in processing.

Therefore, it is a primary object of this invention to provide a charge injection imaging device in which image data is read out in a manner by which KTC noise and fixed pattern noise are automatically cancelled.

It is a further object of this invention to provide a charge injection imaging device in which low bandwidth amplifiers are confined within the narrow pitch between columns.

Other objects of the invention will be in part obvious and will in part appear hereinafter. The invention accordingly comprises a system possessing the construction, combination of elements and arrangement of parts which are exemplified in the following detailed disclosure.

SUMMARY OF THE INVENTION

A charge injection device comprises an array of photosensitive elements, each one of which has noise defining electronic information signals associated therewith and generates image defining electronic information signals in response to incident scene light. Means are provided for sensing and amplifying the image and noise defining electronic information signals from the array of photosensitive elements in a selectively ordered sequence. A plurality of serially connected storage elements connects to receive the amplified image and noise defining electronic information signals in the selectively ordered sequence. Each of the storage elements is structured to store image and/or noise defining electronic information signals corresponding to one of the photosensitive elements in the array. Means are provided for advancing the image and noise defining electronic information signals through the serially connected storage elements in a manner whereby each of the storage elements stores a respective one of the image and/or noise defining electronic information signals for each photosensitive element for a determined time interval.

Means operate to simultaneously retrieve selected image and noise defining electronic information signals from selected ones of the serially connected storage elements at select succeeding ones of the determined time intervals to provide image defining electronic information signals for each succeeding photosensitive element from which the noise defining electronic information signals are automatically cancelled.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

FIG. 3A is a schematic block diagram for the storage line portion of the charge injection imaging device of FIG. 1 showing the storage line in substantially greater detail;

FIG. 3B is a time versus signal diagram showing the advancement of selected signal values with time along the storage line of FIG. 3A; and FIG. 3C is a timing diagram showing the variation in phase control voltages with time for the storage line of FIG. 3A.

DESCRIPTION OF THE PREFERRED EMBODIMENTS

Figure 1:
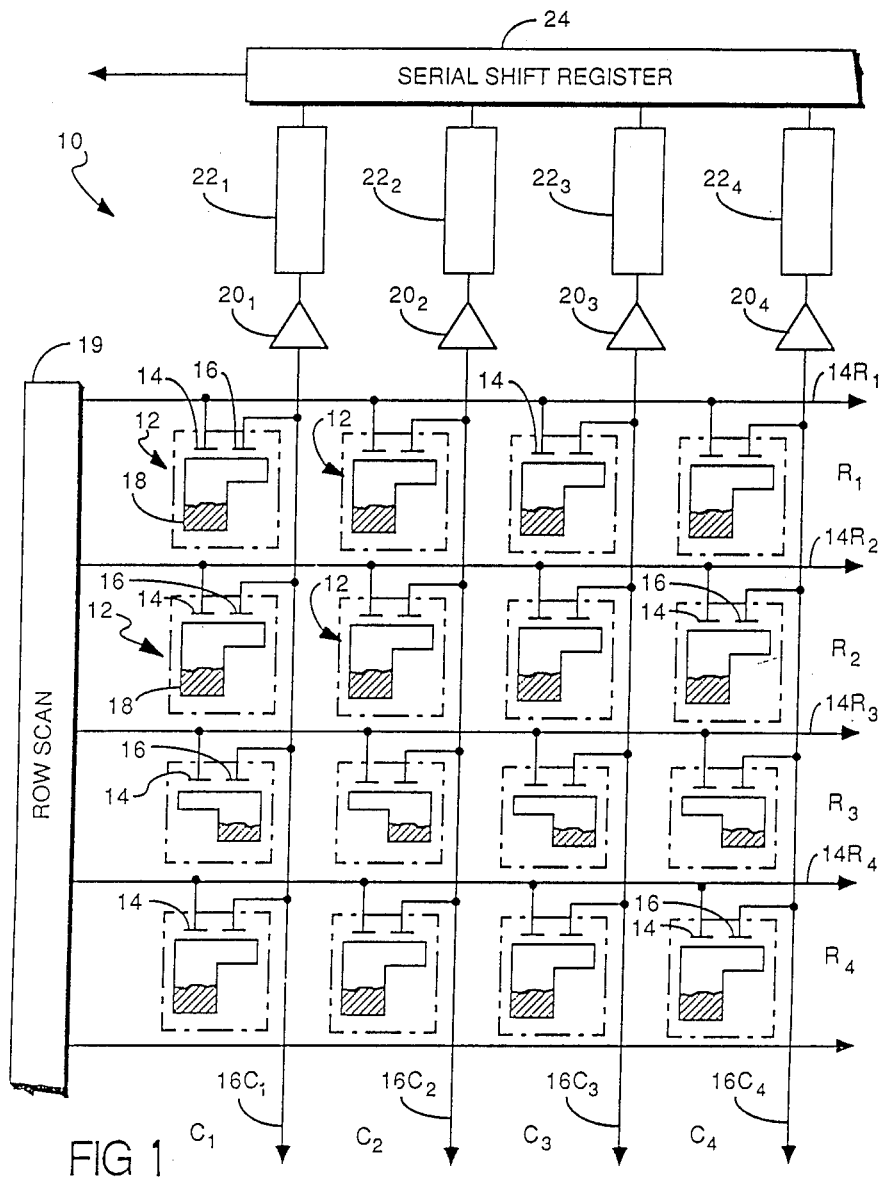
FIG. 1 is a schematic block diagram for the charge injection imaging device of this invention including its special features for facilitating low noise readout.

Referring now to FIG. 1, there is shown generally at 10 the charge injection imaging device of this invention comprising a two-dimensional array of photosensitive elements 12 arranged in rows $R_1$–$R_4$ and columns $C_1$–$C_4$. Each of the photosensitive elements 12 comprises a row electrode 14 and a column electrode 16 disposed on a silicon substrate so as to store photogenerated charges 18 in potential wells under the electrodes in a manner as is well known in the art. As is readily apparent, the row electrodes 14 of each row are commonly interconnected by row lines 14 $R_1$-$R_4$. In like manner, the electrodes 16 of each column are commonly connected by column lines 16 $C_1$-16 $C_4$. The two-dimensional array of photosensitive elements 12 and their associated row and column electrodes 14, 16 and common interconnect lines herein described are well known in the art and thus need not be described in any further detail herein. It will be readily understood that although FIG. 1 shows only a four photosensitive element by four photosensitive element array, in actual practice such imaging arrays comprise a substantially greater number of photosensitive elements.

The row electrode interconnect lines 14 $R_1$-14 $R_4$ are controlled by a row scan circuit 19 in a manner as to be more fully described in the following discussion. The column electrode interconnect lines 16 $C_1$-16 $C_4$ connect, respectively, to amplifier circuits $20_1$-$20_4$ which operate in the manner of this invention to be hereinafter described. The output signals from amplifiers $20_1$-$20_4$ are, in turn, directed to respective storage described in substantially more detail in the following discussion. The storage lines $22_1$-$22_4$, in turn, output signals to a serial shift register 24 which provides a continuous stream of electronic information signals corresponding to image data derived from each photosensitive element 12 in succeeding order along each succeeding row.

Figure 2:
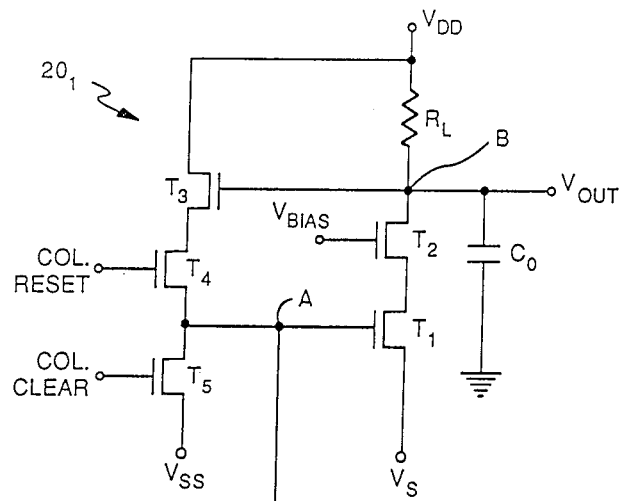
FIG. 2 is a schematic block diagram for the amplifier portion of the charge injection imaging device of FIG. 1 showing the amplifier portion in substantially greater detail.
Figure 2:
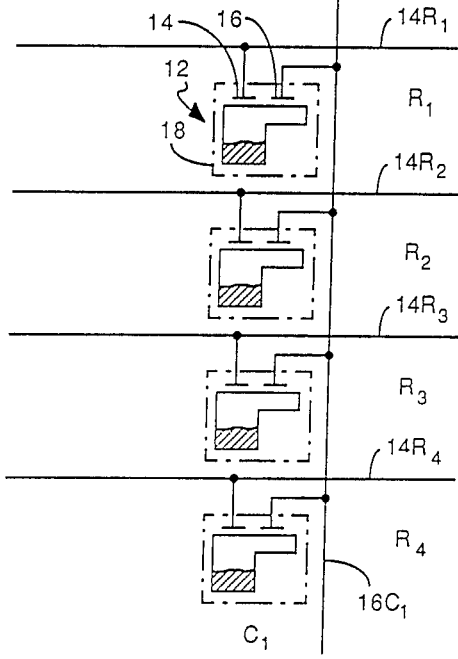

Referring now to FIG. 2 where like numerals refer to previously-described elements, there is shown in substantially more detail the components of one of the amplifier circuits $20_1$. It will be readily understood that the amplifier circuits $20_1$-$20_4$ are identical and that only one amplifier circuit $20_1$ need be described in detail. The amplifier circuit $20_1$ comprises a pair of MOS field effect transistors $T_1$ and $T_2$ connected in cascaded relationship with respect to each other. The input to the amplifier circuit $20_1$ from the column electrode, interconnect line 16 $C_1$ as shown at node A connects to the gate electrode of transistor $T_1$. The drain and source electrodes of transistors $T_1$ and $T_2$, respectively, are in common connection with respect to each other while the source electrode of transistor $T_1$ connects to a constant low voltage source $V_S$. The gate electrode to the transistor $T_2$ connects to a control voltage $V_{BIAS}$ which controls the amplifier in the manner of this invention to be subsequently described herein. The drain electrode of transistor $T_2$ connects to a node B which, in turn, defines the output terminal for the amplifier at $V_{out}$. The transistors $T_2$ and $T_1$ are in serial connection with a load resistor $R_L$ and in parallel connection with an output capacitor $C_0$. The load resistor $R_L$, in turn, connects to a steady state high voltage source $V_{DD}$. The output capacitor $C_0$ and load resistor $R_L$ cooperate to limit the bandwidth of the amplifier circuit $20_1$.

The amplifier circuit $20_1$ also includes means for resetting the voltage level at node A comprising two MOS field effect transistors $T_3$ and $T_4$ connected in cascade relationship with respect to each other. The source and drain electrodes of the transistors $T_3$ and $T_4$, respectively, are in common connection with respect to each other. The gate electrode to the transistor $T_3$ is in common connection with the node B and hence, the output terminal $V_{out}$ while the drain electrode of transistor $T_3$ connects to the high steady state voltage source $V_{DD}$. The gate electrode to the transistor $T_4$, in turn, connects to a control voltage which varies in the manner of this invention to be subsequently described. The source electrode of the transistor $T_4$ is in common connection to the node A and the electrode common interconnect line 16 $C_1$.

The amplifier $20_1$ also includes means for clearing the node A comprising an MOS field effect transistor $T_5$ having its drain electrode connecting to the node A and the column electrode common interconnect line 16 $C_1$ and its source electrode connecting to a low steady state voltage source $V_{SS}$. The gate electrode to the transistor $T_5$ connects to a control voltage which is varied in the manner of this invention to be subsequently described herein.

Referring now to FIG. 3A, there is shown in substantial detail the storage line $22_1$ comprising an input stage 26 in serial connection with a plurality of succeeding serially connected charge coupled device (CCD) storage stages $28_1$-$28_n$. Again, as will be readily understood, all the storage lines $22_1$-$22_4$ are identical and only one storage line $22_1$ need be described in detail. Each of the CCD storage stages $28_1$-$28_n$ comprises four succeeding storage areas or phases ($\phi 1$-$\phi 4$). Charges corresponding to image and noise defining electronic information signals are advanced through succeeding phases of each succeeding stage $28_1$-$28_n$ in a sequential manner by transfer gates or electrodes (not shown) which are sequentially energized in a well-known manner. Four of the transfer gates or electrodes $30_1$-$30_4$ are in common connection with respect to each other and retrieve image and noise defining electronic information signals from the storage line $22_1$ in the manner of this invention as will be subsequently described herein. It will be readily understood that the first two transfer electrodes $30_1$ and $30_2$ connect, respectively, to the fourth phase $\phi 4$ of the first storage stage $28_1$ and the second phase $\phi 2$ of the third storage stage $28_3$. In like manner, the last two transfer gates $30_3$ and $30_4$ connect, respectively, to the fourth phase $\phi 4$ of the third from the last storage stage $28_{n-2}$ and the second phase $\phi 2$ of the last storage stage $28_n$. The line from which the transfer electrodes $30_1$-$30_4$ are commonly interconnected, in turn, is directed by way of an amplifier circuit 32 to an output terminal $V_{out}$. The input bias to the commonly connected transfer electrodes $30_1$-$30_4$ is controlled by way of an MOS field effect transistor $T_6$ having a drain electrode connected to a high steady state voltage source $V_{BIAS}$ and a gate electrode connected to a variable control voltage $V_{RES}$.

Operation of the charge injection imaging device 10 of this invention proceeds as follows. Referring now to FIG. 2, image defining scene light is allowed to impinge during an exposure interval upon the photosensitive elements 12 so as to photogenerate charges 18 in potential wells under the row and column electrodes 14 and 16 as is well known in the art. During the exposure interval, both the row and column electrodes of all of the photosensitive elements 12 are energized to a high voltage level by way of the row electrode common interconnect lines 14 $R_1$-14 $R_4$ and the column electrode common interconnect lines 16 $C_1$-16 $C_4$ in a manner as is well known in the art. Under these conditions potential wells under the row electrodes 14 are deeper so that photogenerated charges 18 are stored under the row electrodes 14 as shown in the drawings.

The charges stored in the photosensitive elements 12 in each of the columns ($C_1$-$C_4$) are simultaneously read out for all the photosensitive elements 12 in each succeeding row starting with the first row $R_1$. Although the following description is limited primarily to the operation of only one amplifier $20_1$ and one storage line $22_1$, it will be readily understood that all the amplifiers $20_1$–$20_4$ and all the storage lines $22_1$–$22_4$ operate simultaneously and in the identical manner.

At the beginning of each row readout starting with the first row $R_1$, the column electrodes 16 are reset to the voltage level of node B by applying a high voltage (binary logic 1) input signal to the gate electrode of transistor $T_4$, thereby establishing gain stabilization. After the reset is complete, the transistor $T_4$ is turned off by applying a low voltage (binary logic 0) input signal to its gate electrode. As a result of this resetting process, the voltage level of node A contains noise due to the fluctuation of the voltage across reset transistor $T_4$. This noise is KTC noise as previously discussed and ultimately will be cancelled in the manner of this invention.

The row $R_1$ electrodes 14 are thereafter set to a low voltage level by the row scan circuit 18 applying the appropriate low voltage to the row electrode common interconnect line 14 $R_1$. The charge stored under the row $R_1$ electrodes 14, in turn, is transferred to the corresponding column electrodes 16 in the row $R_1$. The charges transferred into the column electrodes 16 in this manner cause the voltage or signal level at node A in each of the column electrode common interconnect lines 16 $C_1$–16 $C_4$ to change by an amount proportional to the size of the charge transferred thereto. This change in voltage at node A, in turn, is amplified by the transistors $T_2$ and $T_1$ to provide an amplified output voltage at node B.

The changed voltage at node B corresponds to both image and noise defining electronic information signals including KTC noise induced at each one of the column electrode common interconnect lines 16 $C_1$–16 $C_4$ by the corresponding one of reset transistors $T_4$ and $T_3$ and fixed pattern noise resulting from the variations in the crossing of the row electrode common interconnect lines 14 $R_1$–14 $R_4$ with the column electrode common interconnect lines 16 $C_1$–16 $C_4$.

In the preferred embodiment, the signal level at node B is repeatedly sampled a determinate number of times. During each sample time, a charge representing the signal is created and stored in the input stage 26 of the storage line $22_1$. Thus, at the end of the sampling period a large charge composed of a plurality of small charges corresponding to each sample is present in the input stage 26 of the storage line $22_1$. This sampling process enables the bandwidth of each amplifier to be substantially reduced without increasing the size of the storage capacitor $C_0$ and load resistor $R_L$. In this manner, the amplifier circuits $20_1$–$20_4$ can be maintained within the narrow pitch of each of the columns $C_1$–$C_4$.

The row scan circuit 18 next operates to apply a high voltage to the row electrodes 14 in the row $R_1$ thereby affecting the transfer of the charges under the column electrodes 16 back into the row $R_1$ electrodes 14. The signal level at node B is again sampled in the aforementioned manner and stored in the input stage 26 of the storage line $22_1$. This last sampled signal contains KTC noise. As will be readily understood, prior to the transfer of the KTC noise defining electronic information signal to the input stage 26, the previously transferred image and noise defining electronic information signal is successively advanced from the input stage 26 to the first storage area or phase $\phi 1$ of the first storage stage $28_1$. Thus, in this manner first electronic information signals corresponding to the image, KTC noise, and fixed pattern noise and second electronic information signals corresponding to the KTC noise are successively transferred, respectively, into two succeeding stages of the storage line $22_1$.

Difficulty arises in reading out fixed pattern noise since it requires a sample of the output of the photosensitive element immediately after the photosensitive element has been cleared of photogenerated charges. However, as a result of the fact that a portion of the injected charge is recollected in nearby photosensitive elements, it is necessary to wait until one or more or, in this instance, three succeeding rows of photosensitive elements are read before transferring the charges which define fixed pattern noise. In other words, in order to transfer charges or signals corresponding to the fixed pattern noise of the photosensitive elements of row $R_1$, it is necessary to wait until the charges from the photosensitive elements 12 of the third succeeding row $R_4$ have been transferred. After transferring the charges from the third succeeding row $R_4$ of photosensitive elements 12, the column electrodes 16 must be thereafter set to a high voltage level in order to accommodate the readout of the fixed pattern noise.

Toward that end and in conjunction with the subsequent transfer of charge from the photosensitive elements 12 of row $R_4$, the row $R_1$ electrodes 14 are set to a low voltage by turning on transistor $T_5$. In this manner, the row $R_1$ photosensitive elements 12 are cleared of charge since both the row electrodes 14 and the column electrodes 16 are simultaneously set to a low voltage. The row $R_1$ electrodes 14 are subsequently brought back to a high voltage level in concert with the aforementioned turning off of all the $T_5$ transistors. Resetting all the column electrode 16 voltages to the voltage level at each respective node B in the aforementioned manner by turning on all the $T_4$ transistors, as will be readily understood, also operates to set the column electrodes 16 of the row $R_1$ of photosensitive elements to a high voltage level. In the last step of the sequence, the row scan circuit 19 operates to set the row electrodes 14 of the first row $R_1$ of photosensitive elements 12 to a low voltage. As will be now understood, the four photosensitive elements 12 of row $R_1$ are cleared of signal charge so that the signal transfer to respective ones of the node A by way of respective ones of the column interconnect lines 16 $C_1$ 16–$C_4$ defines the fixed pattern noise for respective ones of the photosensitive elements 12 of row $R_1$. In this manner fixed pattern noise defining electronic information signals for each photosensitive element 12 of row $R_1$ are transferred outside of the succeeding order in which image and KTC noise defining electronic information signals are transferred for the photosensitive elements of row $R_1$. Instead, the fixed pattern noise defining electronic information signals for the photosensitive elements 12 of $R_1$ are transferred in sequence with the transfer of image and KTC noise defining electronic information signals for the photosensitive elements 12 of row $R_4$.

The signal level at node A is subsequently amplified in the aforementioned manner to provide an amplified output electronic information signal at node B corresponding to the fixed pattern noise. The fixed pattern noise defining electronic information signal is thereafter sampled and transferred in the aforementioned manner to the input stage 26 of the storage line $22_1$. As will be readily understood, prior to the transfer of the fixed pattern noise defining electronic information signal to the input stage 26, the previously transferred image and KTC noise defining electronic information signals for the photosensitive elements of row $R_1$ are successively advanced in correspondence with the transfer of image and noise defining electronic information signals from the three succeeding rows $R_2$, $R_3$ and $R_4$ along succeeding storage areas or phases of the storage line $22_1$. Thus, in this manner three succeeding electronic information signals for each photosensitive element 12 are provided in ordered spaced apart sequence from the amplifier $20_1$ to the storage line $22_1$. In this manner, three spaced apart electronic information signals are provided for each row $R_1$ photosensitive element wherein the first signal corresponds to image defining scene light incident to the row $R_1$ photosensitive element together with the KTC and fixed pattern noise associated with the row $R_1$ photosensitive element, and the second signal which immediately succeeds the first signal corresponds to the KTC noise associated with the row $R_1$ photosensitive element. The third signal which succeeds the transfer of signals from the row $R_4$ photosensitive element corresponds to the fixed pattern noise associated with the row $R_1$ photosensitive element. As is readily apparent, this ordered sequence for the transfer of electronic information signals although described only for the first row $R_1$ photosensitive elements is sequentially repeated for the photosensitive elements of all the succeeding rows $R_2$-$R_4$.

Referring now to FIG. 3A in conjunction with FIGS. 3B and 3C, there can be seen the location of charges in various storage areas or phases in the storage stages $28_1$-$28_n$ at various time intervals $t_1$-$t_4$. Electrodes or gates associated with the various storage areas or phases ($\phi 1$-$\phi 4$) operate in a well-known manner to advance the aforementioned succeeding electronic information signals along the storage stages $28_1$-$28_n$ until reaching the positions as shown at $t_1$ in FIG. 3B. Thus, at time $t_1$ the first image defining electronic information signal including the KTC and fixed pattern noise first transferred from the amplifier $20_1$ to storage line $22_1$ is advanced to the fourth phase $\phi 4$ of storage stage $28_{n-1}$ as shown at $SIG_1$. In like manner, the second succeeding electronic information signal corresponding to the KTC noise is advanced to the fourth phase $\phi 4$ of storage stage $28_{n-2}$ as shown at $KTC_1$. It is readily apparent that this pattern is repeated for each succeeding photosensitive element 12 until reaching the electronic information signal for the KTC noise for the 4th photosensitive element 12 as stored in the fourth phase $\phi 4$ of the storage stage $28_2$ and shown at $KTC_4$. The next succeeding electronic information signal stored in the fourth phase $\phi 4$ of storage stage $28_1$ corresponds to the fixed pattern noise for the first photosensitive element 12 to which the image defining electronic information signal $SIG_1$ and the $KTC_1$ correspond. As is readily apparent, for the aforementioned example n=12, and thus the fixed pattern noise defining electronic information signal as shown at $FPN_1$ is transferred in succeeding order with the image and noise defining electronic information signals and the KTC noise defining electronic information signals ($KTC_4$) for the fourth photosensitive element in the column.

The control voltages to the four phases ($\phi 1$-$\phi 4$) change in a time interval from $t_1$ to $t_2$ as shown in FIG. 3C to advance the charges along the storage stages $20_1$ through $28_n$ as shown in line $t_2$ of FIG. 3B. In the next succeeding time $t_3$, the phase electrode control voltages change as shown in FIG. 3C to advance the charges to the position as shown at line $t_3$ in FIG. 3B. At time $t_3$ it can be seen that the image and noise defining electronic information signal ($SIG_1$) is located in the second phase $\phi 2$ of storage stage $28_n$ adjacent transfer electrode $30_4$. The fourth phase $\phi 4$ of storage stage $28_{n-2}$ under transfer electrode $30_3$ has just been cleared of KTC defining electronic information signals ($KTC_1$) so as to leave a signal level corresponding to the negative value of the KTC defining electronic information signal ($-KTC_1$). The KTC defining electronic information signals ($KTC_4$) for the fourth succeeding photosensitive element 12 in the respective column can be seen to be advanced to the second phase $\phi 2$ of the storage stage $28_3$ under transfer electrode $30_2$. The fourth phase $\phi 4$ of the storage stage $28_1$ under transfer electrode $30_1$ has just been cleared of the fixed pattern noise defining electronic information signal ($FPN_1$) so as to leave a signal level corresponding to the negative value of the fixed pattern noise defining electronic information signal ($-FPN_1$).

Thus, at the beginning of each line time ($t_1$) a is now readily apparent, the KTC noise defining electronic information signal ($KTC_1$) and a fixed pattern noise defining electronic information signal ($FPN_1$) are located, respectively, under the third and first floating transfer gates $30_3$ and $30_1$. At the same time, $t_1$ the storage areas or phases under the second and fourth floating transfer gates $30_2$ and $30_4$, respectively, are clear of charge. At this time ($t_1$), the floating transfer gates $30_1$-$30_4$ are set to a high signal level $V_{BIAS}$ by transistor $T_6$ on through control voltage $V_{RES}$. Transistor $T_6$ is thereafter turned off so as to allow the transfer gates $30_1$ through $30_4$ to float at the aforesaid high signal $V_{BIAS}$.

During the second succeeding transfer cycle as shown at line $t_3$ in FIG. 3B, the charges corresponding to KTC defining electronic information signals ($KTC_1$) and the fixed pattern noise defining electronic information signals ($FPN_1$) are transferred from the third and first floating transfer gates $30_3$ and $30_1$, respectively, offsetting the voltage at which the gates are floated. At the same time the image and noise defining electronic information signal ($SIG_1$) and the KTC noise defining electronic information signal ($KTC_4$) are transferred to the fourth and second transfer gates $30_4$, $30_2$, respectively, adding to the signal level at which the transfer gates are floated. In this manner an image defining electronic information signal is automatically provided at the common node of the transfer gates $30_1$ through $30_4$ from which KTC noise defining electronic information signals and fixed pattern noise defining electronic information signals are automatically cancelled. As will be readily understood, the fixed pattern noise defining electronic information signals are sensed from each photoresponsive element in each respective column after the charge has been cleared from the next three succeeding photoresponsive elements in each respective column. Thus, the fixed pattern noise defining electronic information signals are sensed from the photoresponsive elements 12 outside the succeeding order in which the image and KTC noise defining electronic information signals are sensed from the photosensitive elements. Instead, the fixed pattern noise defining electronic information signals are sensed from the photosensitive elements 12 in correlation with the sensing of image and KTC noise defining electronic information signals for photosensitive elements spaced apart therefrom by three photosensitive elements along their respective columns.

As should now be readily apparent, the fixed pattern noise defining electronic information signal ($FPN_1$) sensed after the fourth photoresponsive element also inherently includes KTC noise defining electronic information signals for the fourth photoresponsive element. Thus, the transfer of the KTC noise defining electronic information signal ($KTC_4$) for the fourth photoresponsive element transferred to the second floating transistor electrode $30_2$ is offset by its identical component which forms an inherent part of the fixed pattern noise defining electronic information signal ($FPN_1$) subtracted from the signal level of the first floating transfer electrode $30_1$.

The signal level at the common node between the floating transfer electrodes $30_1$ through $30_4$ thus provides an image defining electronic information signal in ordered sequence for each succeeding photosensitive element 12 from which both the KTC and fixed pattern noise defining electronic information signals are automatically offset. This image defining electronic information signal is amplified by the amplifier 32 and output at terminal $V_{out}$ to the serial shift register 24 which operates in a well-known manner to provide a continuous stream of image defining electronic information signals for each succeeding photosensitive element in each row.

The invention herein described is by no means limited to the above-described order in which the image and noise defining electronic information signals are transferred from the photosensitive elements provided that the fixed pattern noise defining electronic information signals are transferred only after the next three succeeding rows of photosensitive elements are cleared of charge.

Other embodiments of the invention, including additions, subtractions, deletions and other modifications of the preferred disclosed embodiments of the invention will be obvious to those skilled in the art and are within the scope of the following claims.

What is claimed is:

1. A charge injection device comprising:
    a two-dimensional array of photosensitive elements arranged in rows and columns each element of which has noise defining electronic information signals associated therewith and generates image defining electronic information signals in response to incident scene light;
    means for transferring and amplifying said image and noise defining electronic information signals from said array of photosensitive elements by simultaneously transferring image and/or noise defining electronic information signals for each photosensitive element of each row of said array, and also transferring image and/or noise defining electronic information signals in succeeding order for each photosensitive element along each column wherein a portion of said element defining electronic information signals for each photosensitive element are transferred outside of said succeeding order in correlation with the transfer of image and noise defining electronic information signals for photosensitive element spaced apart therefrom along their respective columns;
    a plurality of groups of serially connected storage elements connected to receive said amplified image and noise defining electronic information signals in said succeeding order from each column, respectively, each of said groups of said storage elements being structured to simultaneously store image and/or noise defining electronic information signals for each said photosensitive element in each row in the order in which said signals are transferred from their respective columns;
    means for advancing said image and noise defining electronic information signals for each photosensitive element in each row through said groups of serially connected storage elements, respectively, in the order in which said signals are transferred from their respective columns and in a manner whereby each of said storage elements stores a respective one of the image and/or noise defining electronic information signals for each photosensitive element for a determined time interval; and
    means for simultaneously retrieving selected image and noise defining electronic information signals for each photosensitive element in each row in succeeding order from their respective columns including said portions of said noise defining electronic information signals transferred outside said succeeding order from selected ones of said serially connected storage elements of each of said groups at select succeeding one of said determined time intervals to provide image defining electronic information signals for each succeeding photosensitive element from which the noise defining electronic information signals are automatically cancelled.

2. The charge injection device of claim 2 wherein said plurality of storage elements comprises a plurality of serially connected charge coupled device (CCD) stages each stage of which comprises a select number of distinct storage areas through which the advancement of image and/or noise defining electronic information signals are controlled by the selective sequential energization of a first plurality of electrodes associated with respective ones of said stages, and said means for simultaneously retrieving selected image and/or noise defining electronic information signals comprises a second plurality of electrodes in common connection with respect to each other and associated with select ones of said distinct storage areas.

3. The charge injection device of claim 2 wherein said means for simultaneously retrieving selected image and/or noise defining electronic information signals further comprises control means for setting the signal level of said common connection between said second plurality of electrodes to a select level immediately prior to said select succeeding ones of said determined time intervals during which said select image and/or noise defining electronic information signals are retrieved and thereafter floating said common connection during said select succeeding ones of said determined time intervals.

4. The charge injection device of claim 2 wherein said means for transferring and amplifying said image and/or noise defining electronic information signals operates to transfer an image and noise defining electronic information signal corresponding to incident scene light, KTC noise and fixed pattern noise, and a KTC noise defining electronic information signal in succeeding order for each succeeding photosensitive element in their respective columns and a fixed pattern noise defining electronic information signal corresponding to each said succeeding photosensitive element but transferred outside of said succeeding order of transfer, said storage means operates to store said image and noise defining electronic information signal, said KTC noise defining electronic information signal and said fixed pattern noise defining electronic information signal in select succeeding ones of said storage areas of said serially connected charge coupled device (CCD stages), said advancing means operates to advance said image and noise defining electronic information signal, said KTC noise defining electronic information signal and said fixed pattern noise defining electronic information signal through said serially connected storage elements, and said retrieving means operates to simultaneously retrieve for each succeeding photosensitive element the image and noise defining electronic information signal, and KTC noise defining electronic information signal, and fixed pattern noise defining electronic information signal for that photosensitive element in a manner providing an image defining electronic information signal for each succeeding photosensitive element that does not include either KTC or fixed pattern noise defining electronic information signals.

5. The charge injection device of claim 1 wherein said array of photosensitive elements includes a column electrode and a row electrode for each photosensitive element together with means for providing a common connection between all the electrodes in each column and each row, respectively, and said means for transferring and amplifying said image and/or noise defining electronic information signals comprises amplifying means for amplifying said image and/or noise defining electronic information signals from each of said columns of commonly connected electrodes, reset means for setting the signal level of each of said columns of commonly connected electrodes to determined high signal levels at select times, and clearing means for setting the signal level of each of said columns of commonly connected electrodes to determined low signal levels at select times.

6. The charge injection device of claim 5 including sampling means operatively associated with said amplifying means and said storage means for repeatedly sampling the signal level output from said amplifying means and directing the total value of said repeatedly sampled signal level for storage in the first of said serially connected storage elements so as to reduce the bandwidth of said amplifying means.

7. The charge injection device of claim 6 wherein said amplifying means comprises for each column a pair of MOS field effect transistors connected in cascade with respect to each other with the gate of one of said MOS field effect transistors of each pair connecting to a respective one of said commonly connected column electrodes, each pair of MOS field effect transistors also being in serial connection with respect to a load resistor and in parallel connection with respect to an output capacitor, said load resistor and output capacitor cooperatively operating to limit the bandwidth of said amplifying means.

8. The charge injection device of claim 7 wherein said reset means for setting the signal level of each of said columns of commonly connected electrodes comprises for each column another pair of MOS field effect transistors connected in cascade with respect to each other wherein the drain electrode of one of said MOS field effect transistors of each of said other pair of reset transistors connects to a respective one of said commonly connected column electrodes, and the gate electrode of the other one of said MOS field effect transistors of each of said other pair is in respective common connection with respect to said load resistor, said output capacitor and the source electrode of the other of said MOS field effect transistors of said pair of amplifier transistors.

9. The charge injection device of claim 8 wherein said clearing means for setting the signal level of each of said columns of commonly connected electrodes to determined low signal levels comprises for each column an MOS field effect transistor the source electrode of each one of which connects to a respective one of said commonly connected column electrodes and the drain electrode of each one of which connects, respectively, to a source for providing said determinate low signal level.

\* \* \* \* \*